United States Patent Office 3,247,245
Patented Apr. 19, 1966

3,247,245
ALKYLATED POLYPHENYL ETHER SULFONATES
Arthur S. Teot and Edward P. Merica, Midland, Mich., assignors to The Dow Chemical Company, Midland, Mich., a corporation of Delaware
No Drawing. Filed Jan. 12, 1962, Ser. No. 166,471
7 Claims. (Cl. 260—512)

The present invention relates to a novel class of organic intermediates and their sulfonated derivatives. More particularly the present invention concerns alkylated polyphenyl ethers and their polysulfonic acid and sulfonic acid alkali metal salts. These novel compounds can conveniently be exemplified by the following formulae

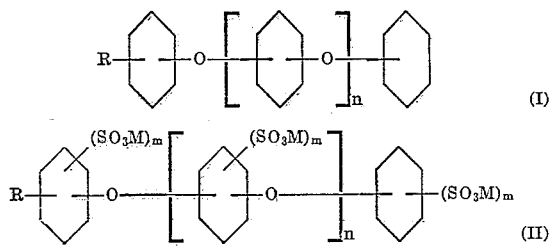

wherein R represents an alkyl radical having at least 6 carbon atoms, M represents hydrogen or an alkali metal, $n$ represents an integer from 1 to 4, $m$ represents an integer from 0 to 2 and the sum of the $m$'s equal at least 3, and until the sums of the $m$'s equal $n+3$ no more than 1 sulfonate moiety is attached to each phenylene moiety. The novel compounds within the generic Formula I are useful intermediates in the preparation of compounds falling within Formula II and are also useful per se as high temperature fluids stable under mild oxidative atmospheres up to about 700° F. Thus, these materials find utility as transformer fluids, lubricants and the like.

The novel compounds of generic Formula II have been tested and found to be useful as intermediates in preparing soluble copper catalysts and as active surfactants in strong alkali metal hydroxide solutions. The latter property is useful in preparing concentrate compositions of caustic solutions useful in cleaning articles of manufacture. Further utility for the compounds falling within the generic Formula II is their ability to solubilize such materials as defoaming agents in the strong caustic solutions.

GENERAL METHOD OF PREPARATION OF ALKYLATED POLYPHENYL ETHERS

The new alkylated polyphenyl ethers of Formula I can be prepared by (A) reacting an alkyl phenol (phenol is usede herein and hereinafter to refer to a hydroxy aromatic compound of the benzene series, hydroxy phenyl ethers and hydroxy polyphenyl ethers) or its alkali metal salt with a halophenyl ether in the presence of a catalytic amount of a copper catalyst or (B) an alkylated halobenzene can be reacted with an alkali metal salt of a hydroxy polyphenyl ether. It is to be understood that these compounds can be prepared in the presence of copper as a catalyst according to the following general equations:

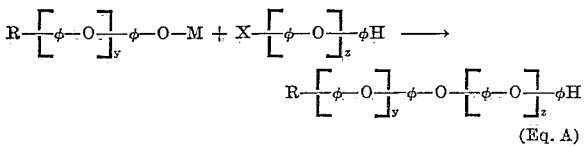

(Eq. A)

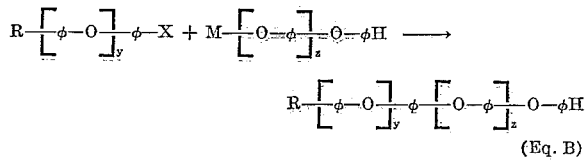

(Eq. B)

The symbol $\phi$ represents a phenylene moiety, the symbols $y$ and $z$ represent integers from 0 to 5 and the sum of the integers $y$ and $z$ is 1 to 4, X represents a middle halogen, and the symbols R and M have the same significance as in Formulas I and II.

The reactions described in Equations A and B are carried out in the manner of the well known Ullmann condensation reaction, that is, in the presence of a catalytic amount of copper at temperatures of from about 220° to 270° C. or in the manner taught in the copending application Serial No. 142,486, wherein the employment of a copper salt of an alkylated diphenyl oxide sulfonic acid is taught, or in the presence of a copper salt of a compound corresponding to generic Formula II above wherein M in the formula has been substituted with copper.

The following examples illustrate the method of preparation of the compounds which fall under the generic Formula I above, but are not to be construed as limiting:

Example 1

550 g. (2.5 moles) of p-nonylphenol was warmed to 100° C.; 79 g. (1.2 moles) of potassium hydroxide (85% pellets) was added thereto and the mixture was stirred and heated up to 160–170° C. at reduced pressure (ca. 20 mm. Hg) to remove the water of reaction. The resulting solution was cooled until it began to freeze and 10 g. of copper dust and 249 g. (1 mole) of p-bromodiphenyl oxide were added. This mixture was stirred and heated at 200–210° C. for 4 hours. It was then cooled to 100°, diluted with toluene and filtered. The filtrate was distilled and 321 g. of p-nonylphenyl-p-phenoxyphenyl ether was obtained having a boiling point of 214°–220° C. at 0.2 mm. Hg. This represents a yield of 82.7%. Infrared spectroscopy confirmed the structure.

Example 2

532 g. (2.86 moles) of phenoxyphenol (92% meta isomer) was mixed with 145 g. (2.2 moles) of potassium hydroxide (85% pellets) and the mixture was stirred and heated to 160° C. at reduced pressure (ca. 20 mm. Hg) to remove the water of reaction. The resulting solution was cooled to 100° C. and 10 g. of copper dust and 373 g. of dodecylchlorodiphenyl oxide were added. This mixture was stirred and heated at 200–220° C. for 4 hours. It was then cooled to 100°, diluted with toluene and filtered. The filtrate was distilled and 150 g. of para-(para-dodecylphenoxy)phenyl meta-phenoxyphenyl ether was obtained having a boiling point of 256°–278° C. at 0.2 mm. Hg. The yield was 28.7%. Infrared spectroscopy confirmed the structure.

Example 3

In a manner similar to Example 1, employing a mixture of 60% meta-bromodiphenyl oxide and 40% para-bromodiphenyl oxide in place of para-bromodiphenyl oxide, there was prepared an oil identified by infrared spectroscopy as 60% para-nonylphenyl meta-phenoxyphenyl ether and 40% para-nonylphenyl para-phenoxyphenyl ether having a boiling point at 0.8 mm. Hg of 208°–212° C. in a yield of 77.1%.

Example 4

In a manner similar to Example 1, employing a mixture of 60% meta-bromodiphenyl oxide and 40% para-bromodiphenyl oxide in place of para-bromodiphenyl oxide and para-dodecylphenol in place of nonylphenol, there was prepared an oil identified by infrared spectroscopy as 60% para-dodecylphenyl meta-phenoxyphenyl ether and 40% para-dodecylphenyl para-phenoxyphenyl ether having a boiling point at 0.4 mm. Hg of 220–232° C. in a yield of 76.1%.

*Example 5*

In a manner similar to Example 1, employing para-dodecylphenol in place of nonylphenol there was prepared an oil identified by infrared spectroscopy as para-dodecylphenyl para-phenoxyphenyl ether having a boiling point at 0.3 mm. Hg of 228–234° C. in a yield of 78.8%.

*Example 6*

In a manner similar to Example 2 employing para-phenoxyphenol in place of meta-phenoxyphenol there was obtained an oil identified by infrared spectroscopy as para-(para-dodecylphenoxy)phenyl para-phenoxyphenyl ether having a boiling point at 0.4 mm. Hg of 254–280° C. in a 43.4% yield.

GENERAL PROCEDURE FOR PREPARATION OF ALKYLATED POLYPHENYL ETHER POLYSULFONATES

The alkylated polyphenyl ethers prepared in the above manner are sulfonated by the dropwise addition of sulfur trioxide in a chlorinated hydrocarbon solvent. The amount of sulfur trioxide employed is slightly in excess of the molar quantity necessary to sulfonate to the degree desired. The temperatures at which the sulfonation is carried out are from about 10° to about 30° C.

The following examples illustrate the sulfonation techniques and the products obtainable thereby, but are not to be construed as limiting the same.

*Example 7*

A solution of 32.8 grams (0.41 mole) of sulfur trioxide in 320 milliliters of methylene chloride was added in a dropwise manner with stirring over a 15-minute period to 38.8 grams of para-nonylphenyl meta-phenoxyphenyl ether (60% meta) in 400 milliliters of methylene chloride. The reaction mixture was maintained at 25°–27° C. throughout the addition. Stirring was continued for an additional 45 minutes. Immediately upon cessation of stirring the reaction mixture was poured into 500 milliliters of water and neutralized with 50% sodium hydroxide. The mixture separated into two layers, an organic layer and an aqueous layer. The aqueous layer was separated and dried on a drum dryer. As a result of these operations ca. 50 grams of sodium para-nonylphenyl meta-phenoxyphenyl ether trisulfonate was obtained. Analysis showed the material to have an average of 3.7 sulfonate groups per molecule.

The following table shows the results obtained employing various ethers of Examples 2 through 6 and various amounts of sulfur trioxide as reactants in the manner of the foregoing Example 7.

The table also sets forth the solubility of the respective compounds in various concentrations of aqueous caustic. The solubility was determined by mixing 1% by weight of the respective compounds in 99% by weight of one of the various aqueous caustic solutions.

TABLE I.—SODIUM ALKYLPOLYPHENYL ETHER SULFONATES

| Alkylate | Moles SO3 used | Avg. no. sulfonate groups on molecule | Solubility in NaOH | | |
|---|---|---|---|---|---|
| | | | 30% | 40% | 50% |
| p-Nonylphenyl m-phenoxyphenyl ether (60% meta) | 4.1 | 3.7 | S | S | S |
| | 4.4 | 4.0 | S | S | S |
| p-Nonylphenyl p-phenoxyphenyl ether | 4.1 | 3.2 | S | S | I |
| | 4.4 | 3.5 | S | S | I |
| | 3.1 | 3.1 | S | I | I |
| p-Dodecylphenyl m-phenoxyphenyl ether (60% meta) | 4.1 | 3.3 | S | S | I |
| | 4.4 | 4.0 | S | S | S |
| | 4.1 | 3.4 | S | S | I |
| p-Dodecylphenyl p-phenoxyphenyl ether | 4.4 | 3.5 | S | S | I |
| | 5.5 | 4.8 | S | S | S |
| p-(p-Dodecylphenoxy)phenyl m-phenoxy phenyl ether (90% meta) | 3.1 | 3.1 | S | I | I |
| | 4.1 | 4.1 | S | S | I |
| p-(p-Dodecylphenoxy)phenyl p-phenoxyphenyl ether | 4.4 | 4.3 | S | S | I |

For purposes of comparison with the solubility of the novel compounds the solubilities of various ionic surfactants is set forth in the table below:

| Surface Active Agent | Maximum concentration of aqueous sodium hydroxide in which 1% by weight of anionic surfactant is soluble |
|---|---|
| Sodium dodecyldiphenyl oxide disulfonate | 23% |
| Sodium nonyldiphenyl oxide disulfonate | 26% |
| Sodium dodecylbenzene disulfonate | 2% |

*Example 8*

The following table records the surface active properties of the compounds of the present invention.

TABLE II.—SURFACE ACTIVE PROPERTIES OF 0.1% SOLUTIONS OF THE LISTED ALKYLATED POLYPHENYL ETHER SULFONATES IN DISTILLED WATER

| Alkylate | Average no. sulfonate groups on molecule | Surface tension (dynes/cm.) | Interfacial tension (dynes/cm.) | Foam height (initial) (mm.) | Foam height (5 min.) (mm.) | Wetting time (min.) |
|---|---|---|---|---|---|---|
| p-Nonylphenyl m-phenoxyphenyl ether | 3.7 | 35.8 | 10.6 | 79 | 48 | 1.18 |
| | 4.0 | 36.8 | 13.1 | 60 | 25 | 0.83 |
| p-Nonylphenyl p-phenoxyphenyl ether | 3.2 | 50.5 | 24.8 | 75 | 20 | 0.72 |
| | 3.5 | 43.6 | 20.2 | 50 | 8 | 0.92 |
| | 3.1 | 34.7 | 9.0 | 145 | 30 | 0.42 |
| p-Dodecylphenyl m-phenoxyphenyl ester | 3.3 | 33.9 | 9.6 | 125 | 20 | 1.04 |
| | 4.0 | 40.5 | 12.9 | 50 | 15 | 0.80 |
| | 3.4 | 40.9 | 14.4 | 100 | 10 | 1.28 |
| p-Dodecylphenyl p-phenoxyphenyl ether | 3.5 | 42.3 | 19.9 | 100 | 20 | 0.82 |
| | 4.8 | 43.3 | 16.0 | 40 | 5 | 0.80 |
| p-(p-Dodecylphenoxy)phenyl m-phenoxyphenyl ether | 3.1 | 35.8 | 9.5 | 155 | 145 | 0.45 |
| | 4.1 | 42.9 | 15.2 | 135 | 115 | 0.47 |
| p-(p-Dodecylphenoxy)phenyl p-phenoxyphenyl ether | 4.3 | 40.9 | 17.7 | 105 | 10 | 0.55 |

Example 9

The following table sets forth the properties of the compounds in aqueous 5% NaOH solutions.

TABLE III.—SURFACE ACTIVE PROPERTIES IN 5% NaOH OF THE LISTED ALKYLATED POLYPHENYL ETHER SULFONATES

| Alkylate | Average No. sulfonate groups on molecule | Surface tension (dynes/cm.) | Interfacial tension (dynes/cm.) | Foam height (initial) (mm.) | Foam height (5 min.) (mm.) |
|---|---|---|---|---|---|
| 0.1% Solutions: | | | | | |
| p-Dodecylphenyl p-phenoxyphenyl ether | 4.8 | 46.9 | 13.7 | 153 | 10 |
| p-Nonylphenyl m-phenoxyphenyl ether | 3.7 | 35.8 | 6.5 | 135 | 0 |
| 0.3% Solutions: | | | | | |
| p-Dodecylphenyl m-phenoxyphenyl ether | 3.3 | 45.5 | 11.9 | 175 | 35 |
| p-Nonylphenyl m-phenoxyphenyl ether | 3.7 | 37.2 | 7.4 | 175 | 0 |

Example 10

To further illustrate the unique properties of the sulfonated alkylated polyphenyl ethers of the present invention a bottle washing concentrate composition was prepared to illustrate the ability of the compounds not only to go into solution in strong caustic but to solubilize other materials in the strong caustic.

To 94 parts by weight of an aqueous 50% caustic (NaOH) solution was added 6 parts of an aqueous 20% solution of sodium glucoheptanate.

To the same solution was added with mild stirring 1% by weight of an aqueous 50% sodium p-dodecylphenyl p-phenoxyphenyl ether pentasulfonate solution. The entire solution became clear almost immediately and did not settle out upon standing for several days.

The solution prepared above can be diluted to 5% caustic concentration and employed as a bottle washing composition for content and label removal from bottles.

The sulfonated compounds of the present invention can be employed to prepare bottle washing concentrates having the following general compositions:

| | Percent by weight |
|---|---|
| Alkylated sulfonated polyphenyl ethers | 0.05–5 |
| Sequestering agents, such as sodium gluconate or sodium glucoheptanate | .6–10 |
| Antifoam agent | 0–.6 |
| Aqueous 30–50% alkali metal hydroxide | Balance |

It is to be further understood that various other ingredients normally employed in such compositions can be solubilized in the concentrate. One such material is a foam control agent of the generic class of nonionic surfactants such as the ethylene oxide-butylene oxide condensates with organic compounds having at least three active hydrogens such as the alkylenepolyamine, alkanolamines, glycols, glycerines and the like. One such suitable compound is that obtained by condensing 15 moles of ethylene oxide then 4.5 moles of butylene oxide with monoethanolamine. Other compounds which can be solubilized and which are commercially available on the market are Pluronics, Polyglycol 112–2 and the like.

We claim:

1. An alkylated polyphenyl ether sulfonic acid having the formula

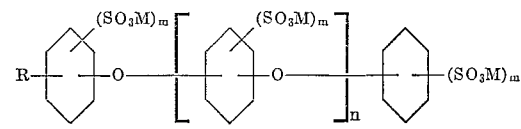

wherein R represents an alkyl radical having from 6 to 18 carbon atoms, $n$ represents an integer from 1 to 4, $m$ represents an integer from 0 to 2, and the sum of the $m$'s equal at least four, and M represents a member selected from the group consisting of an alkali metal and hydrogen; and mixtures thereof.

2. Sodium para-nonylphenyl para-phenoxyphenyl ether tetrasulfonate.

3. Sodium para-nonylphenyl meta-phenoxyphenyl ether tetrasulfonate.

4. Sodium para-dodecylphenyl para-phenoxyphenyl ether tetrasulfonate.

5. Sodium para-dodecylphenyl meta-phenoxyphenyl ether tetrasulfonate.

6. Para-(para-dodecylphenoxy)phenyl meta-phenoxyphenyl ether tetrasulfonic acid.

7. Para-(para-dodecylphenoxy)phenyl para-phenoxyphenyl ether tetrasulfonic acid.

References Cited by the Examiner

UNITED STATES PATENTS

| | | | |
|---|---|---|---|
| 2,081,876 | 5/1937 | Prahl | 260—512 X |
| 2,140,824 | 12/1938 | Vernon | 260—613 |
| 2,500,107 | 3/1950 | Weichselbaum | 252—161 |
| 2,517,636 | 8/1950 | David | 252—161 |
| 2,555,371 | 6/1951 | Prutton | 260—512 |
| 2,739,171 | 3/1956 | Linn | 260—613 |
| 2,854,477 | 9/1958 | Steinhauer | 260—512 |
| 2,940,929 | 6/1960 | Diamond | 260—613 X |
| 3,006,852 | 10/1961 | Barnum et al. | 260—613 X |

LORRAINE A. WEINBERGER, *Primary Examiner.*

LEON ZITVER, *Examiner.*